(No Model.)

G. MARIS.
PESTLE HANDLE.

No. 278,575. Patented May 29, 1883.

WITNESSES:
Theo. G. Hoster
C. Sedgwick

INVENTOR:
G. Maris
BY Munn & Co
ATTORNEYS.

UNITED STATES PATENT OFFICE.

GEORGE MARIS, OF NEW YORK, N. Y.

PESTLE-HANDLE.

SPECIFICATION forming part of Letters Patent No. 278,575, dated May 29, 1883.

Application filed February 5, 1883. (No model.)

*To all whom it may concern:*

Be it known that I, GEORGE MARIS, of the city, county, and State of New York, have invented a new and Improved Pestle-Handle, of which the following is a full, clear, and exact description.

The object of my invention is to provide a new and improved handle for pestles, which handle is light, is not affected by acids, and the surface of which cannot be scraped off readily by means of the spatula used to scrape the material that is being mixed or pounded from the pestle.

Reference is to be had to the accompanying drawings, forming part of this specification, in which similar letters of reference indicate corresponding parts in both the figures.

Figure 1:
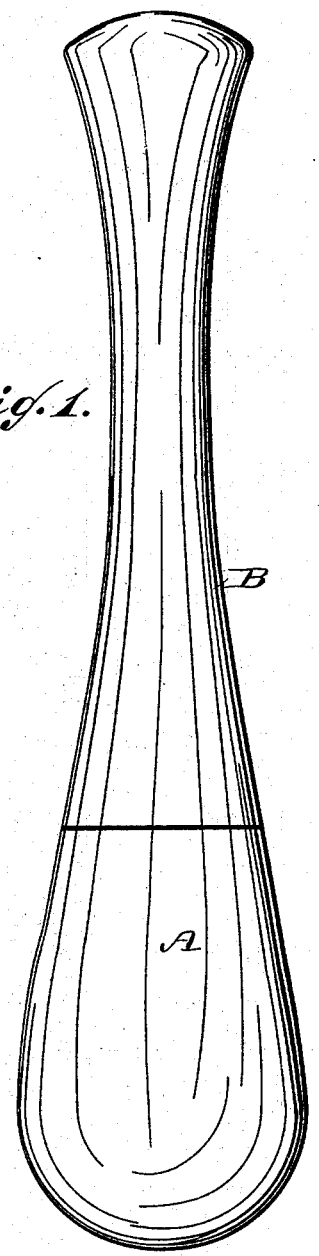
Figure 2:
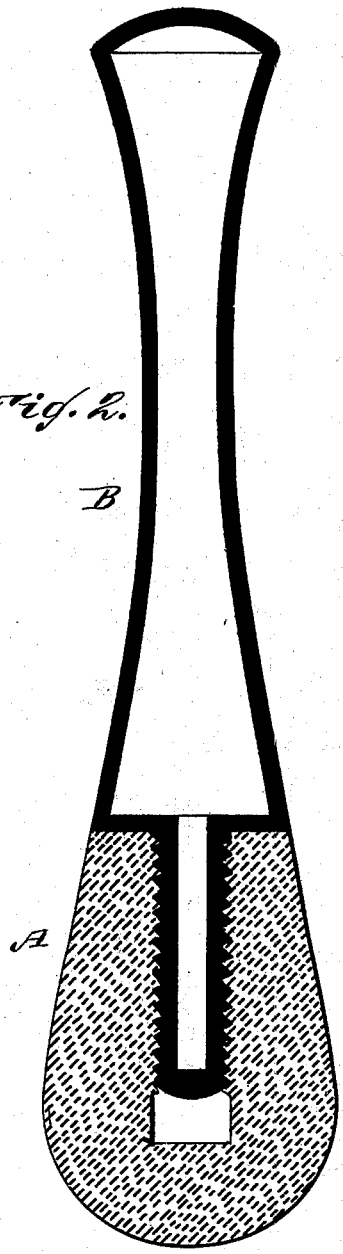

Figure 1 is a longitudinal elevation of a pestle provided with my improved handle. Fig. 2 is a longitudinal sectional elevation of the same.

The pestle A, made of Wedgwood ware, porcelain, or other suitable material, is provided with a handle, B, made of hard rubber, which handle is screwed into and cemented to the pestle, or otherwise suitably secured to the same. The pestle and the handle are made in the usual shape. The handle is made hollow, as shown. The handle will thus be very light, as hard rubber is very light and permits of making the handle hollow. It is very advantageous to have a light handle on a pestle, as the main weight of the pestle is then accumulated in the lower part of the same, thereby materially facilitating using the pestle, for it is much easier to operate with a pestle which has its weight concentrated at the lower part than with a pestle in which the weight is evenly or about evenly distributed through the handle and pestle. Furthermore, the rubber handle is not attacked by acids and discolored by the same, as wooden handles are, and the rubber is so hard that no part of it can be scraped into the mass or powder while scraping the same from the pestle, by means of a spatula, into the mortar. It frequently happens that parts of the wooden handles, which are much softer than rubber handles, are scraped off and dropped into the mass or powder in the mortar, and thus deteriorate the same more or less, according to the nature of the said mass or powder.

Having thus described my invention, I claim as new and desire to secure by Letters Patent—

In pestles, the body A, having a thread around the wall of a central hole, in combination with a hollow hard-rubber handle, B, having an externally-threaded projection adapted to fit said hole, as described.

GEORGE MARIS.

Witnesses:
OSCAR F. GUNZ,
C. SEDGWICK.